United States Patent [19]

Moeller

[11] Patent Number: 4,617,576

[45] Date of Patent: Oct. 14, 1986

[54] THERMAL PRINTHEAD STRUCTURE

[75] Inventor: Charles R. Moeller, Carlsbad, Calif.

[73] Assignee: International Totalizator Systems, Inc., San Diego, Calif.

[21] Appl. No.: 674,776

[22] Filed: Nov. 26, 1984

[51] Int. Cl.[4] .............................................. G01D 15/10

[52] U.S. Cl. ................................ 346/76 PH; 400/120; 219/543; 338/309

[58] Field of Search ................ 346/76 R, 76 PH, 162, 346/163, 155, 139 L, 139 R; 400/120, 124, 125; 101/93.38; 219/216 PH, 543; 338/307-309

[56] References Cited

U.S. PATENT DOCUMENTS

| | | | |
|---|---|---|---|
| 3,163,489 | 12/1964 | Borne | 346/76 |
| 3,312,979 | 4/1967 | Torres et al. | 346/76 |
| 3,624,661 | 10/1971 | Shebanow et al. | 346/74 |
| 3,718,936 | 2/1973 | Rice, Jr. | 346/74 |
| 3,825,722 | 7/1974 | Taniguchi | 219/216 |
| 3,984,844 | 10/1976 | Tanno et al. | 346/74 |
| 4,254,564 | 3/1981 | Ohkubo et al. | 346/76 PH |
| 4,489,485 | 12/1984 | Tatsumi et al. | 346/76 PH |

OTHER PUBLICATIONS

IBM Tech. Discl. Bulletin, vol. 25, No. 4, Sep. 1982, pp. 2117–2119, "Universal Printhead" by Kuntzleman et al.
"Personal Computer Printer is User Installable" by Joseph D. Barbers; Aug. 1984, of Hewlett-Packard Journal.

*Primary Examiner*—Arthur G. Evans
*Attorney, Agent, or Firm*—Brown, Martin & Haller

[57] ABSTRACT

A wear-resistant thermal printhead employs a wearplate deposited atop the printhead substrate adjacent the resistive print element as a hard shield to impacting tickets and abrasive material propelled across the printhead. The wearplate comprises a layer of thick film glass doped with a suitably hard material such as zirconia, alumina, or diamonds. Printhead position is adjusted so that the wearplate is impacted instead of the print element and conductive traces carrying current to the print element are routed out of the way along the backside of the substrate opposite the side subject to abrasion.

13 Claims, 7 Drawing Figures

THERMAL PRINTHEAD STRUCTURE

BACKGROUND OF THE INVENTION

Of the many ways devised to produce a printed page, none is more clever than the thermal printer. Known for inherent simplicity and quiet operation, this popular device burns tiny dots on heat-sensitive paper in graphic and character-shaped patterns.

Betting terminals seen at the racetrack are one common application. These terminals automatically process bet tickets somewhat the size of a business card by printing wagering information on the ticket as it slides across what is one of the most critical components of a thermal printer, the thermal printhead.

A typical printhead is a window pane thick ceramic plate, or "substrate", roughly 3×2 inches. Near one end lies a slender print element that looks like a straight line drawn across the substrate with an ink pen. This print element is electrically-resistive material deposited on the substrate, and it heats up much like a toaster element when electric current is forced through it.

Unlike a toaster element, the whole print element does not heat all at once. Instead, electrical circuitry forces current through very small print element segments to generate precisely controlled hot spots along the length of the print element. When a bet ticket driven across the printhead slides over the print element, as many as fifty hot spots per inch individually flicker on and off at just the right times to burn the desired pattern of dots into a heat-sensitive layer on the ticket. Thus, an inherently simple and quiet printing operation is performed.

But there are certain problems. One problem common to betting terminals and similar applications is printhead wear caused by bet tickets becoming soiled with abrasive material such as sand. As the ticket slides across the printhead, it acts much like a piece of sandpaper, and eventually printhead components are sanded down to the point where they require repair or replacement. This invention combats the problem.

Existing printheads are especially vulnerable to abrasive wear in several respects. First, a series of hair-thin wires, or "conductive traces", formed side-by-side on the substrate carry electric current down the length of the substrate from control circuitry to the print element. These traces are usually located on the surface of the substrate where the ticket slides. In this location they are easily damaged.

In addition, the print element is usually formed on the substrate near one end in a position lying across the conductive traces. It is above the level of the rest of the printhead and even more easily damaged.

So, abrasive damage to the conductive traces and print element is common, and it is not long before repair is required. One method of doing this is to cut off the worn print element end of the substrate, the last inch or so, and bond on a new print element end. Then each of the individual traces is reconnected and the printhead is put back in service, but only after expending significant time and expense.

An alternate repair approach involves replacing the entire substrate. But since associated electronic circuitry is often built upon the substrate, this too is a costly method.

Consequently, it is desirable to have a new and improved printhead that remains in service longer before repair or replacement is necessary.

It is desirable that the printhead include wear-resistant features that resist abrasive wear caused by impacting tickets.

It is desirable that the wear-resistant features be adaptable for use on existing printheads. And, it is desirable that the wear-resistant features be compatible with existing thermal printer designs.

SUMMARY OF THE INVENTION

This invention recognizes the problems of the prior art and provides a new and improved thermal printhead with the desired attributes.

A thermal printhead structure constructed in accordance with the invention includes a wear-resistant layer deposited on the substrate adjacent the print element. The wear-resistant layer, or "wearplate", is designed to protect the conductive traces and the print element, and it has physical atrributes suitable for resisting printhead abrasion caused by abrasive material sliding across the printhead.

One embodiment includes conductive traces routed out of the way along the backside of the substrate opposite the side that is subject to abrasion, the wearplate being preabraded to expose the hard substrate at the main bearing point.

BRIEF DESCRIPTION OF THE DRAWINGS

Further details of the invention are described with reference to the drawings wherein.

DETAILED DESCRIPTION

Figure 1:
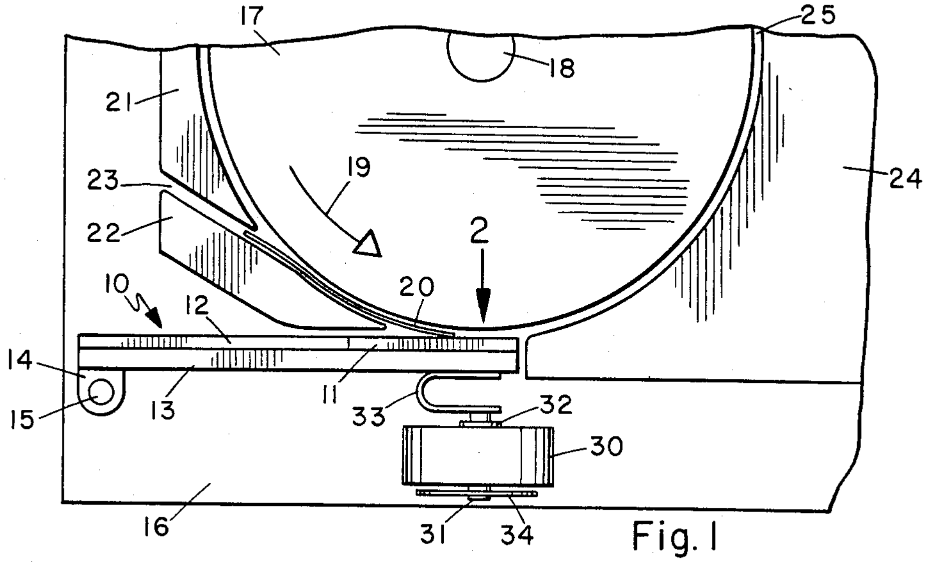
FIG. 1 is a side elevation view of a typical ticket printer mechanism showing the position of the printhead.

An exemplary embodiment of a thermal printhead structure constructed in accordance with the invention is shown in FIG. 1 where it is referred to generally by reference numeral 10 and shown to include forward portion 11, the print element end, and rear portion 12. These two portions are of unitary construction in the illustrated embodiment. However, when repair of existing printheads of this type is required, the print element end corresponding to the forward portion is often cut off and replaced.

Printhead 10 is mounted on a pivotable support structure, such as aluminum support 13, which is provided with suitable pivoting means such as boss 14 and shaft 15. Shaft 15 is attached to the support structure defined by main plate 16, and in this way the printhead is pivotally supported so that it can be pivoted about the longitudinal axis of shaft 15, an axis which can be visualized as extending out of the page normal to main plate 16.

Roller 17 is also mounted on the main plate. It is mounted so that it can be rotated about axle 18 in the direction indicated by arrow 19 for use in propelling ticket 20 across the forward portion of the printhead (FIG. 1).

Additional ticket handling components are employed such as first guide 21 and shoe 22 to form ticket path 23. When a ticket is inserted in the ticket path, it contacts roller 17 as the roller rotates and is propelled forward by frictional forces so that it slides across the printhead. Second guide 24 defines exit path 25 along which the ticket is propelled after passing the printhead.

The printing operation is performed as the ticket slides over the printhead. First of all, a ticket inserted in ticket path 23 is driven along the path by frictional forces between it and the roller. The printhead is pivoted to squeeze the ticket against the roller, both to provide increased driving force and to insure that the ticket contacts the print element, and then printing is performed at the just the right time as the ticket slides by.

A solenoid is employed to pivot the printhead. This is accomplished with solenoid 30 in FIG. 1 which includes armature 31 retained by keeper 32 in contact with operating spring 33. Suitable means known in the art are used to sense the position of ticket 20, and at just the right time the solenoid is electrically activated by known means to cause armature 31 to push operating spring 33 against support 13 and thereby pivot the printhead as desired. Disc 34 is attached to the armature to limit armature travel and the amount the printhead is pivoted. Operating spring 33 achieves a degree of flexibility in printhead position to allow for variances in the roller and ticket dimensions as well as variances caused by foreign objects that may accompany the ticket along its path.

Thus, the thermal printhead is used in conjunction with ticket handling components such as the typical ticket printer mechanism of FIG. 1. And as a result of this use, it is usually worn down by the sanding action of the ticket and other abrasive material sliding across the print element end.

Figure 2:
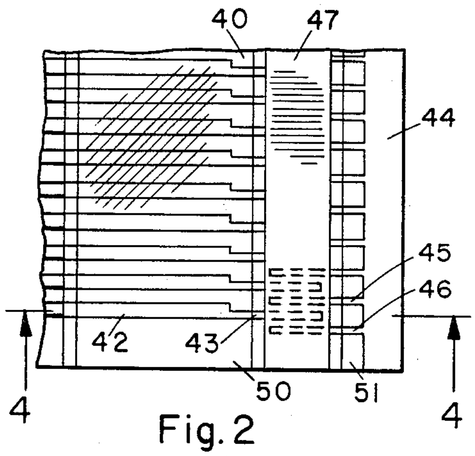
FIG. 2 is an enlarged top plan view of a portion of the printhead as taken in the direction of arrow 2 in FIG. 1.
Figure 3:
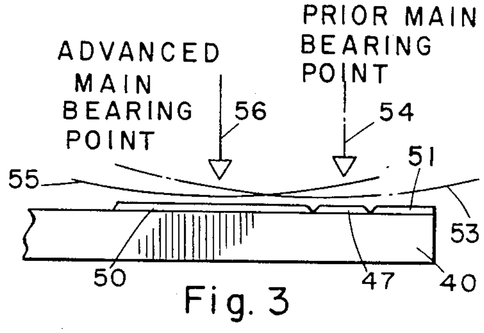
FIG. 3 is an enlarged side elevation view of the printhead showing the relationship to the ticket main bearing point.
Figure 4:
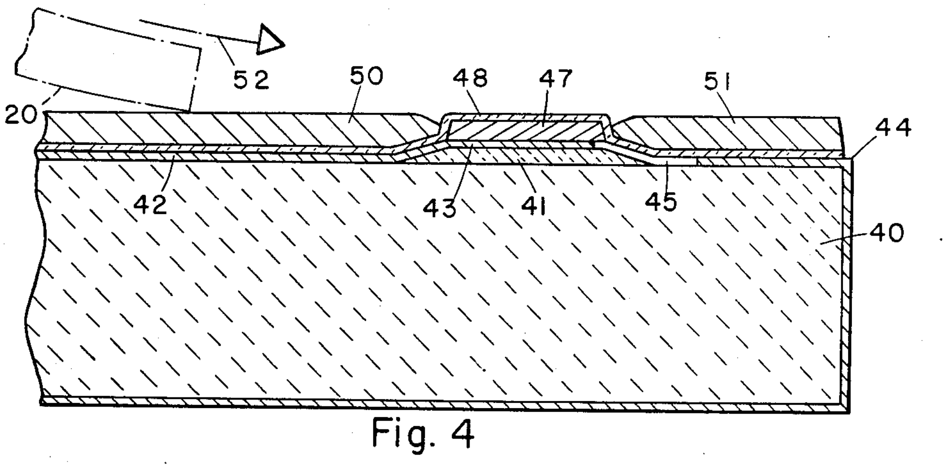
FIG. 4 is an enlarged sectional view taken on line 4—4 of FIG. 2.

Further details of the printhead of this invention are shown in FIGS. 2–4. Printhead 10 comprises substrate 40, composed of a hard material such as alumina, on which is deposited thermal barrier layer 41 (FIG. 4) of a suitable insulating material such as a thick film glass about onehalf mil thick by 200 mils wide. The thermal barrier layer is fabricated by application and firing using known techniques. As many as fifty or so conductive traces per inch are formed side-by-side on the upper surface of the substrate, a representative one being designated numeral 42 in FIG. 2. Each of these conductive traces narrows to a finger over the thermal barrier layer, such as finger 43. Bus 44 is also formed on the substrate and it too includes fingers extending over the thermal barrier layer, such as bus finger 45 and bus finger 46 in FIG. 2.

Over top of these interleaved fingers, across the width of the printhead, is deposited print element 47 using well known materials and fabrication techniques to provide an electrically-resistive print element approximately 1 mil thick by 25 mils wide. This is a thick film thermal print element unlike thin film semiconductor elements. Atop this whole structure is deposited cover dielectric 48, a thin layer of thick film glass approximately 0.2 mil thick that is designed to seal and protect the underlying structure. This thin layer wears rapidly under abrasive operating conditions.

The resulting structure thus far described employs printhead design known in the prior art. Electric current flowing down conductive trace 42 to finger 43 passes through print element 47 to bus fingers 45 and 46 to cause a very small hot spot to develop on the print element (actually two little hot spots that print as one dot). By using known control circuitry to selectively do this along the length of the print element, the hot spots can be made to flicker on and off at just the right times to develop desired patterns in a heat-sensitive layer on a ticket as the ticket slides across the print element, the thermal barrier inhibiting heat transfer to the substrate.

This invention improves the printhead by providing a wear-resistant layer deposited on the substrate adjacent the print element. The wear-resistant layer is composed of a suitably hard protective material deposited on the substrate, such as the thick film glass manufactured by Remex Company that is designated "dielectric #7587". This thick film glass is used as a carrier and it may be doped with zirconia in an amount of approximately 5% by volume, although other amounts and other materials such as alumina and diamonds may be employed. The doped carrier is applied adjacent the print element and fired according to known techniques to fabricate a wear-resistant layer on the substrate.

Two wear-resistant layers, or wearplates, are deposited on the embodiment illustrated in FIGS. 2–4. Forward wearplate 50 is deposited in a position ahead of the print element over an area of the substrate that the ticket first slides across, and trailing wearplate 51 is deposited on the other side of the print element along the path the ticket takes after it slides across the print element (FIGS. 2–4). Arrow 52 in FIG. 4 illustrates the path taken.

In the prior art it was common practice to position the printhead relative to the ticket path so that a ticket propelled down the path would bear upon the printhead right on the print element. This is shown in FIG. 3 by roller 53 and arrow 54 drawn in phantom lines. Abrasive action of the ticket and abrasive material sliding over the printhead soon wore down the approximately 1 mil thick print element.

One aspect of this invention includes adjusting the position of the printhead so that the main bearing point is ahead of the print element as illustrated by roller 55 and arrow 56 in FIG. 3. By readjusting the position of the printhead, the drive forces are absorbed ahead of the print element, and consequently the print element lasts longer.

By depositing wearplate 50 over this advanced main bearing point, the substrate and conductor traces in this area are protected. In addition, the ticket is supported away from the substrate a distance corresponding to the thickness of the print element to further reduce abrasive action of the ticket, and foreign material imbedded in the ticket, as it slides over the print element squeezed between the printhead and the roller. Simply thickening cover dielectric 48 does not adequately improve the shape of the printhead surface, and a thicker cover dielectric actually impairs heat transfer from the print element 47 to ticket 20 (FIG. 4).

Similarly, wear plate 51 not only protects the substrate and bus 44, but it also maintains the ticket at the level of the print element to help reduce abrasion.

Figure 5:
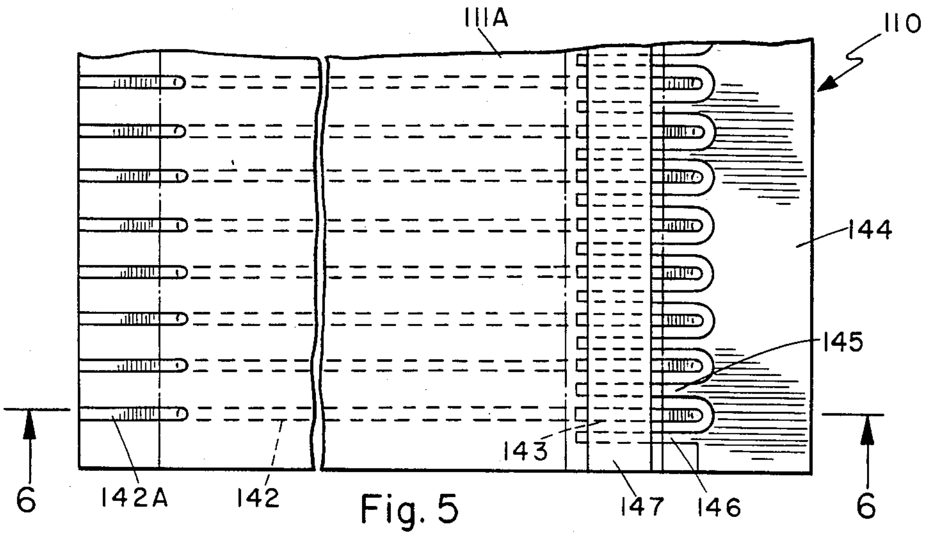
FIG. 5 is a top plan view of an alternative printhead arrangement.
Figure 6:
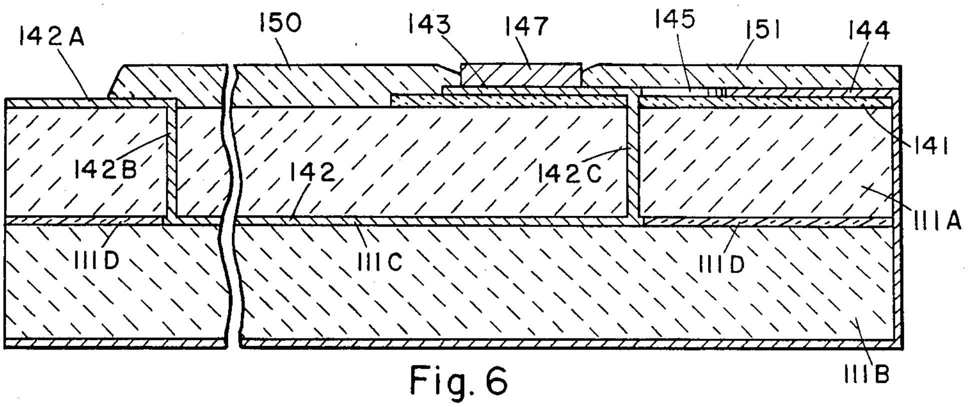
FIG. 6 is an enlarged sectional view taken on line 6—6 of FIG. 5.

An alternate embodiment of the invention designed to further protect the conductive traces is illustrated in FIGS. 5 and 6 using reference numerals increased by 100 over similar components in FIGS. 2–5. This alternate embodiment is referred to generally by reference numeral 110 and shown to include conductive traces, of which conductive trace 142 is representative, that are routed out of the way along a backside of the substrate opposite the area impacted by the ticket.

As illustrated in FIG. 6, the substrate is composed of upper substrate layer 111A and lower substrate layer 111B. Conductive trace 142 includes an upper portion 142A that is routed down a 5 to 7 mil descender hole 142B, along backside 111C of upper substrate layer 111A, and then back up a similarly-sized ascender hole 142C to finger 143 extending over thermal barrier layer 141 and under print element 147. Through holes 142B and 142C are formed using known techniques, and the two substrate layers are bonded together by suitable means of which filler dielectric material 111D is representative in FIG. 6. Wearplate 150 and wearplate 151 are deposited on the substrate in the positions shown, and a far superior lifetime for the printhead results.

The alternate embodiment includes a thermal barrier layer that extends all the way under the bus and bus fingers, as well as all the way under the conductive trace fingers. This provides a flat surface upon which the conductive traces and bus can be formed to simplify fabrication.

The alternate embodiment is shown without a cover dielectric to illustrate that it may be omitted within the precepts of the present invention.

Figure 7:
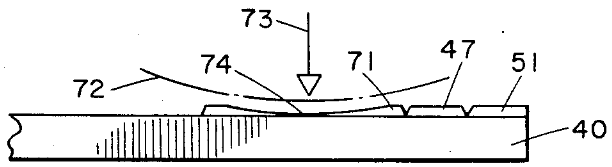
FIG. 7 is an enlarged side elevation view of another alternative printhead arrangement that is pre-abraded in the area of the ticket main bearing point.

In addition to the foregoing features, the wearplate can be pre-shaped in the area of the main bearing point as a further refinement of the printhead. In FIG. 7 there is shown a printhead similar to that illustrated in FIG. 3, but unlike FIG. 3, wearplate 71 in FIG. 7 has been pre-abraded, by suitable means such as lapping, in the area of the main bearing point, to conform to roller 72. Arrow 73 designates the main bearing point, and wear plate 71 has been pre-abraded sufficiently at this point to expose hard substrate at point 74. This aspect of the invention causes the ticket to impact the hard substrate first and then slide over the print element 47 with minimal wear. The advantages of exposing the substrate, which is a dense, very hard material such as alumina, include the fact that it reduces the size and abrasiveness of ticket-bourne particles before they reach the print resistor.

Thus, by readjusting printhead position and/or by the addition of one or more wearplates to existing printheads and print element ends designed for repair of worn printheads, the abrasive action common to such applications as betting terminals can be alleviated and printhead life significantly extended. And by designing new printheads to incorporate the various features of this invention, including one or more wearplates to guard the print element, a new an improved thermal printhead results.

As various changes may be made to the form, construction, and arrangement of the procedures and parts described herein, without departing from the spirit and scope of the invention and without sacrificing any of its advantages, it is to be understood that all matter herein is to be interpreted illustrative and not in any limiting sense.

What is claimed is:

1. A thermal printhead structure which comprises:

a substrate;

a print element deposited on the substrate;

a means for impacting a material for printing, such as a ticket, against said printhead; and a wear-resistant layer means deposited on the substrate immediately adjacent to but not on the print element, for receiving the impact of said material for printing and for resisting printhead abrasion caused by said material for printing and abrasive material contacting the printhead wherein said means for impacting is offset from the print element such that the impact is received mainly on the wear-resistant layer means and immediately adjacent to but not on the print element.

2. The structure recited in claim 1 wherein the wear-resistant layer is composed of a thick film glass deposited on the substrate.

3. The structure recited in clam 2 wherein the thick film glass is doped with a material harder than sand.

4. The structure recited in claim 3 wherein the suitably hard material comprises one or more materials chosen from the group consisting of zirconia, alumina, and diamonds.

5. The structure recited in claim 1 which includes two wear-resistant layers, each wear-resistant layer being deposited on the substrate adjacent an opposite side of the print element.

6. The structure recited in claim 1 wherein the wear-resistant layer is pre-shaped to expose the substrate in a main bearing area of the substrate slightly ahead of the print element.

7. The structure recited in claim 1 wherein the substrate includes a thermal barrier layer beneath the print element.

8. A thermal printhead structure which comprises:

a substrate having a surface over which a material for printing, such as a ticket, to be printed upon can be driven;

a print element deposited on said surface;

means for moving said material for printing over said surface and over said print element;

a wear-resistant layer means deposited on the substrate immediately adjacent to but not on the print element for resisting printhead abrasion caused by the material for printing and abrasive material contacting the printhead; and said moving means including means for impacting the material for printing against the wear-resistant layer means immediately adjacent the print element whereby said means for moving is offset from the print element such that the impact is received mainly by said wear resistant layer and immediately adjacent to but not on the print element reducing the wear contact of the material for printing against the print element to reduce abrasive wear of the print element.

9. The structure recited in claim 1 which includes conductive traces routed out of the way along a backside of the substrate opposite a side on which the print element and wear-resistant layer are deposited.

10. The structure recited in claim 8 wherein the wear-resistant layer comprises a thick film glass carrier doped with a material harder than sand.

11. The structure claimed in claim 1 wherein:

the wear-resistant layer means and the print element having respective upper surfaces with edges that are immediately adjacent, and said respective upper surfaces are in substantially the same plane.

12. The structure claim in claim 1 wherein:

the print element having a thin cover layer;

the wear-resistant layer means and the thin cover layer on the print element having upper surfaces, and said upper surfaces are in substantially the same plane.

13. The structure claimed in claim 1 wherein:

the substrate and the print element having a thin cover layer;

and said wear-resistant layer means being deposited on the thin cover layer on the substrate.

* * * * *